United States Patent
Freitag et al.

(10) Patent No.: US 7,388,490 B2
(45) Date of Patent: Jun. 17, 2008

(54) METHODS AND SYSTEMS FOR LOCATING VOIP TERMINALS FOR IMPROVED 911 SERVICE

(75) Inventors: Gregory A. Freitag, Batavia, IL (US); Gerald W. Pfleging, Batavia, IL (US); George Paul Wilkin, Bolingbrook, IL (US); David A. Zahn, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 308 days.

(21) Appl. No.: 11/171,000

(22) Filed: Jun. 29, 2005

(65) Prior Publication Data
US 2007/0013516 A1    Jan. 18, 2007

(51) Int. Cl.
*G08B 13/14* (2006.01)

(52) U.S. Cl. ............... 340/572.1; 340/572.4; 340/572.7; 340/572.8; 455/404.1; 455/404.2; 455/456

(58) Field of Classification Search ............. 340/572.1, 340/572.4, 572.7, 572.8, 825.45, 825.49, 340/573.1, 573.49, 539.22; 455/404.1, 404.2, 455/456
See application file for complete search history.

(56) References Cited

U.S. PATENT DOCUMENTS

| | | | |
|---|---|---|---|
| 6,396,413 B2 * | 5/2002 | Hines et al. | 340/825.49 |
| 6,678,357 B2 | 1/2004 | Stumer et al. | |
| 2005/0111630 A1 | 5/2005 | Potorny et al. | |
| 2005/0153681 A1 * | 7/2005 | Hanson | 455/404.2 |
| 2005/0213716 A1 * | 9/2005 | Zhu et al. | 379/45 |
| 2006/0293024 A1 * | 12/2006 | Benco et al. | 455/404.2 |

\* cited by examiner

*Primary Examiner*—Tai Nguyen

(57) ABSTRACT

Systems and methods are presented for providing updated VOIP terminal location information to emergency call service providers, in which RFID tags are positioned at various locations within an enterprise and coded with unique tag data. A database is provided with a mapping of RFID tag data and tag locations in the enterprise, and the VOIP phone terminals are equipped or otherwise connected with RFID tag readers. The VOIP phones read the tag data upon initiation of a 911 or other an emergency call and report the tag data to a network server that determines the VOIP phone location according to the tag data and provides the phone location to the emergency call service provider.

22 Claims, 9 Drawing Sheets

FIG. 9

GUID-TO-LOCATION MAPPING (50)

| | |
|---|---|
| GUID 1 (RFID 1) | GEO-LOCATION INFO 1 ($Lat_1$; $Long_1$; $Alt_1$) |
| GUID 2 (RFID 2) | GEO-LOCATION INFO 2 ($Lat_2$; $Long_2$; $Alt_2$) |
| GUID 3 (RFID 3) | GEO-LOCATION INFO 3 ($Lat_3$; $Long_3$; $Alt_3$) |
| GUID 4 (RFID 4) | GEO-LOCATION INFO 4 ($Lat_4$; $Long_4$; $Alt_4$) |
| GUID 5 (RFID 5) | GEO-LOCATION INFO 5 ($Lat_5$; $Long_5$; $Alt_5$) |
| ..... | ..... |
| GUID N (RFID N) | GEO-LOCATION INFO N ($Lat_N$; $Long_N$; $Alt_N$) |

FIG. 10A

DATA FROM VOIP PHONE AT LOCATION L1 (300a)

| | |
|---|---|
| GUID 1 (RFID 1) | SIGNAL LEVEL 1 |
| GUID 2 (RFID 2) | SIGNAL LEVEL 2 |
| GUID 3 (RFID 3) | SIGNAL LEVEL 3 |
| GUID 4 (RFID 4) | SIGNAL LEVEL 4 |

FIG. 10B

DATA FROM VOIP PHONE AT LOCATION L2 (300b)

| | |
|---|---|
| GUID 26 (RFID 26) | SIGNAL LEVEL 26 |
| GUID 43 (RFID 43) | SIGNAL LEVEL 43 |
| GUID 54 (RFID 54) | SIGNAL LEVEL 54 |

METHODS AND SYSTEMS FOR LOCATING VOIP TERMINALS FOR IMPROVED 911 SERVICE

FIELD OF THE INVENTION

The present invention relates to telecommunications in general, and more particularly to improved systems and methods for determining the location of voice-over-IP phone terminals for improved emergency call service.

BACKGROUND OF THE INVENTION

Telephone users have been provided with a vast array of different types and forms of communications services in recent years. In addition to traditional wireline telephones, wireless phones and the Internet have become widely accepted as mediums for telecommunications services in modern society. For instance, wireless communications systems and networks have been constructed and interconnected with the wire-line telephone networks to allow mobile devices to communicate with other mobile devices as well as with ordinary stationary telephones. The wireless systems include various infrastructure to service a wide geographic area divided into regions or "cells" with base stations serving one or more such cells and networked mobile switching centers (MSCs) serving one or more base stations, where the MSCs are operatively coupled with one another and other systems by a wireless network and one or more MSCs may be coupled to a wire-based network to provide communications among and between wireless and/or wireline devices. In common cellular communications systems, the communication path is established through various MSCs and intervening networks and the data is sent in digital form over the same path throughout the call session. Wireless fidelity (WiFi) systems have also become popular, in which the telephone communications data is transferred in packets, wherein the transfer path may change during a call, whereby different packets may travel along different routes, with the received packets being reassembled at the recipient device for conversion to analog audio for provision to the subscriber or user.

In addition to traditional wire-line and wireless telecommunications, the Internet has proliferated in recent years to become a popular communications medium in which data is transferred in packets between devices connected to the network. With respect to telecommunications, moreover, the Internet and other packet-switched (e.g., IP-based) networks are now being employed as a medium for telephone traffic, in which voice information is provided in a packetized data stream along with other data streams being used for data transfer, a technology referred to as voice-over-IP (VOIP), wherein IP refers to the Internet Protocol for the data link layer. VOIP telephones and other VOIP terminals can be operatively connected to the Internet by cables using Ethernet cards or other network interfaces, as well as through IP multimedia subsystem (IMS) Wifi networks, in order to provide telephone service regardless of the point of connection with the IP-based network. In this regard, such VOIP terminals are essentially mobile devices that retain the same phone number at any location, whereby users can originate and receive calls and also interface to other services provided over the Internet and IP-based networks generally, regardless of the current terminal location.

911 and other emergency services have been available for some time through conventional telephone systems, wherein a caller dials "911" or other designated number to connect with emergency service providers in the immediate area. In conventional wire-line systems, each telephone is connected to a telephone line in a known location, whereby the providers of 911 emergency services can ascertain the telephone number of a calling party and consult an automatic location identifier (ALI) database or other suitable data store to translate the telephone number to street address and subscriber name information. When a 911 emergency operator or dispatcher receives a call, it may be essential to direct service providers (e.g., fire department, ambulance, police, etc.) to the correct street address quickly to aid the caller, particularly where the caller is unable to vocally provide the address information to the dispatcher. Thus, for conventional fixed-location telephones, the ALI database provides valuable information in the context of 911 calls. However, since VOIP telephones or terminals can be moved, there is a need for improved methods and apparatus for locating VOIP terminals and providing the terminal locations to emergency service providers.

SUMMARY OF THE INVENTION

A summary of one or more aspects of the invention is now presented to facilitate a basic understanding thereof, wherein this summary is not an extensive overview of the invention, and is intended neither to identify certain elements of the invention, nor to delineate the scope of the invention. Rather, the primary purpose of the summary is to present some concepts of the invention in a simplified form prior to the more detailed description that is presented hereinafter. The invention relates to systems and methods for determining the location of VOIP phones in an enterprise and providing the location information to emergency call service providers and can be advantageously employed to ensure that an emergency system dispatcher or operator will know the current VOIP telephone location to direct appropriate services to the caller, particularly where the VOIP terminal has moved since it's location was last reported to the VOIP service provider and/or where the caller is unable to provide the location during the call.

One aspect of the invention provides a method of determining VOIP terminal locations for improved emergency call services. The method includes reading RFID tag data from one or more RFID tags using an RFID reader in the VOIP terminal or in a wall plate or other network structure connected to the VOIP terminal and the network, and determining the VOIP terminal location based on RFID tag data. The RFID tag data can be read to determine the VOIP device location upon initiation of an emergency call from the VOIP terminal, when the VOIP terminal is connected to a network, when a network element requests the location of the VOIP terminal, or any other time, whether periodic or not. The method may further include providing the VOIP terminal location to an emergency call service provider, wherein the location may be determined and provided to the emergency service provider when an emergency call is initiated from the VOIP terminal and/or the VOIP terminal is connected to a network or location information is requested by a network element. RFID tag data may be read from a plurality of RFID tags that are within range of an RFID reader in the VOIP phone, with the phone location being determined by triangulation, interpolation, or other technique based on the RFID tag data from the plurality of RFID tags. In addition, the method may provide for reading signal strengths for the plurality of RFID tags, wherein the VOIP terminal location can be determined based on the RFID tag data and the signal strengths read from the plurality of RFID tags.

A database may be provided with entries for the RFID tags, wherein each database entry includes a globally unique ID (GUID) programmed in a given RFID tag and geographic location information indicating the location of the given RFID tag (e.g., a GUID to location mapping), in which case the location determination may involve searching the database to find an entry having a GUID matching the RFID tag data and obtaining the geographic location information from the entry. This technique may be advantageous, for example, in cases where one time programmable RFID tags are used, such as where a furniture manufacturer provides RFID tags that are pre-programmed with GUIDs in enterprise furniture. Where the VOIP terminal or associated reader is able to read more than one tag, the location may be determined based on any suitable estimation techniques, such as triangulation, interpolation, etc. using the locations of the tags obtained from the data store mapping. In another possible implementation, the RFID tags are programmed with geographic location, such as GPS longitude, latitude, altitude, etc., that specifies the RFID tag location in the enterprise, where the VOIP terminal location is determined based on the location indicated by the RFID tag data. This approach advantageously allows the VOIP terminal location to be determined directly from the RFID tag data without having to construct, maintain, and consult a GUID to location mapping.

Another aspect of the invention relates to a method for providing a mapping of VOIP phone numbers and locations in an enterprise. This method includes providing RFID tags at different locations within an enterprise, with the RFID tags being programmed with a GUID, and providing a database with a plurality of entries (GUID and corresponding location) for the tags. The method further includes installation of VOIP terminals in the enterprise, reading RFID tag data from at least one of the RFID tags using RFID readers of the VOIP terminals or associated in-line structures, and determining locations of the VOIP terminals in the enterprise based on the RFID tag data read by the VOIP terminals and based on the geographic location information in the database.

In accordance with yet another aspect of the invention, a system is provided for determining the location of a VOIP terminal in an enterprise. The system comprises RFID tags located at different locations within the enterprise, a VOIP terminal having means (e.g., whether integrated in the VOIP terminal or connected thereto) for reading RFID tag data from at least one of the RFID tags, as well as means for determining the VOIP terminal location based on the RFID tag data, where the system may further include means for providing the VOIP terminal location to an emergency call service provider. The system can determine the VOIP phone location at any time, including when a user initiates an emergency call, when the VOIP terminal is connected to a network, or when a network element requests the location of the VOIP terminal. The VOIP terminal may be adapted to read the RFID tag data along with signal strengths from the RFID tags, wherein the VOIP terminal location can be determined based on the RFID tag data and the signal strengths. Furthermore, a database may be provided in the system for determination of the VOIP phone locations, where the database includes entries for a plurality of RFID tags with each database entry including a GUID programmed in a given RFID tag and geographic location information indicating the location of the given RFID tag.

Another aspect of the invention provides a VOIP terminal, comprising a network interface providing operative connection of the VOIP terminal to a network, a telephone apparatus operative to provide telephone service to a user through the network, means for reading RFID tag data from at least one of the RFID tags, and means for providing the RFID tag data to a network element. The terminal may be adapted to read the RFID tag data and provide the RFID tag data to the network element when an emergency call is initiated from the VOIP terminal, when the VOIP terminal is connected to a network, and/or when a server or other network element requests the location of the VOIP terminal.

BRIEF DESCRIPTION OF THE DRAWINGS

The following description and drawings set forth in detail certain illustrative implementations of the invention, which are indicative of several exemplary ways in which the principles of the invention may be carried out. Various objects, advantages, and novel features of the invention will become apparent from the following detailed description of the invention when considered in conjunction with the drawings, in which:

FIG. 9 is a simplified schematic diagram illustrating an exemplary GUID to location mapping for a plurality of RFID tags positioned at various locations in the enterprise of FIG. 1, which may be stored in an emergency services database, a VOIP server data store, or other network element in accordance with the invention;

FIG. 10A is a schematic diagram illustrating RFID tag data and signal strengths read from several nearby RFID tags by the VOIP phone at a first location in the enterprise of FIG. 1;

FIG. 10B is a schematic diagram illustrating another set of data and signal strengths read by the VOIP terminal from several RFID tags near a second exemplary location in the enterprise of FIG. 1;

DETAILED DESCRIPTION OF THE INVENTION

Figure 1:
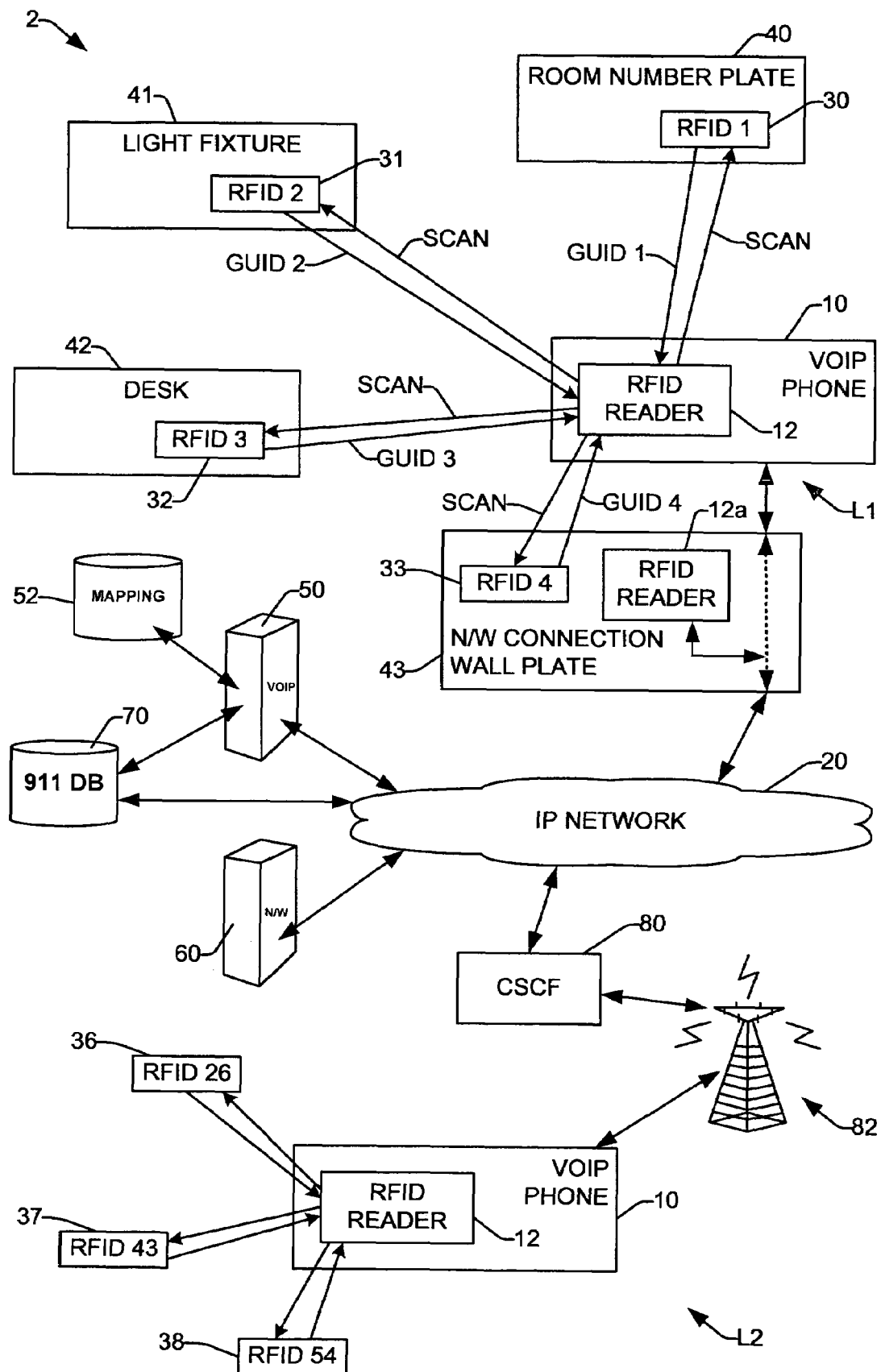
FIG. 1 is a system diagram illustrating an enterprise having a system for determining VOIP phone locations using RFID tags positioned at various known locations and VOIP terminals with RFID tag readers for reading data from one or more tags and providing the tag data to a network server in accordance with one or more aspects of the present invention.

The invention relates to systems and methods for identifying the location of VOIP terminals, with one or more exemplary implementations being illustrated and described hereinafter, wherein like reference numerals are used to refer to like elements throughout and wherein the invention is not limited to the illustrated examples. Although illustrated and described below in the context of certain exemplary networks and systems, the invention finds utility in association with any type of communications apparatus and systems in which VOIP devices are operable to place emergency calls.

Figure 2:
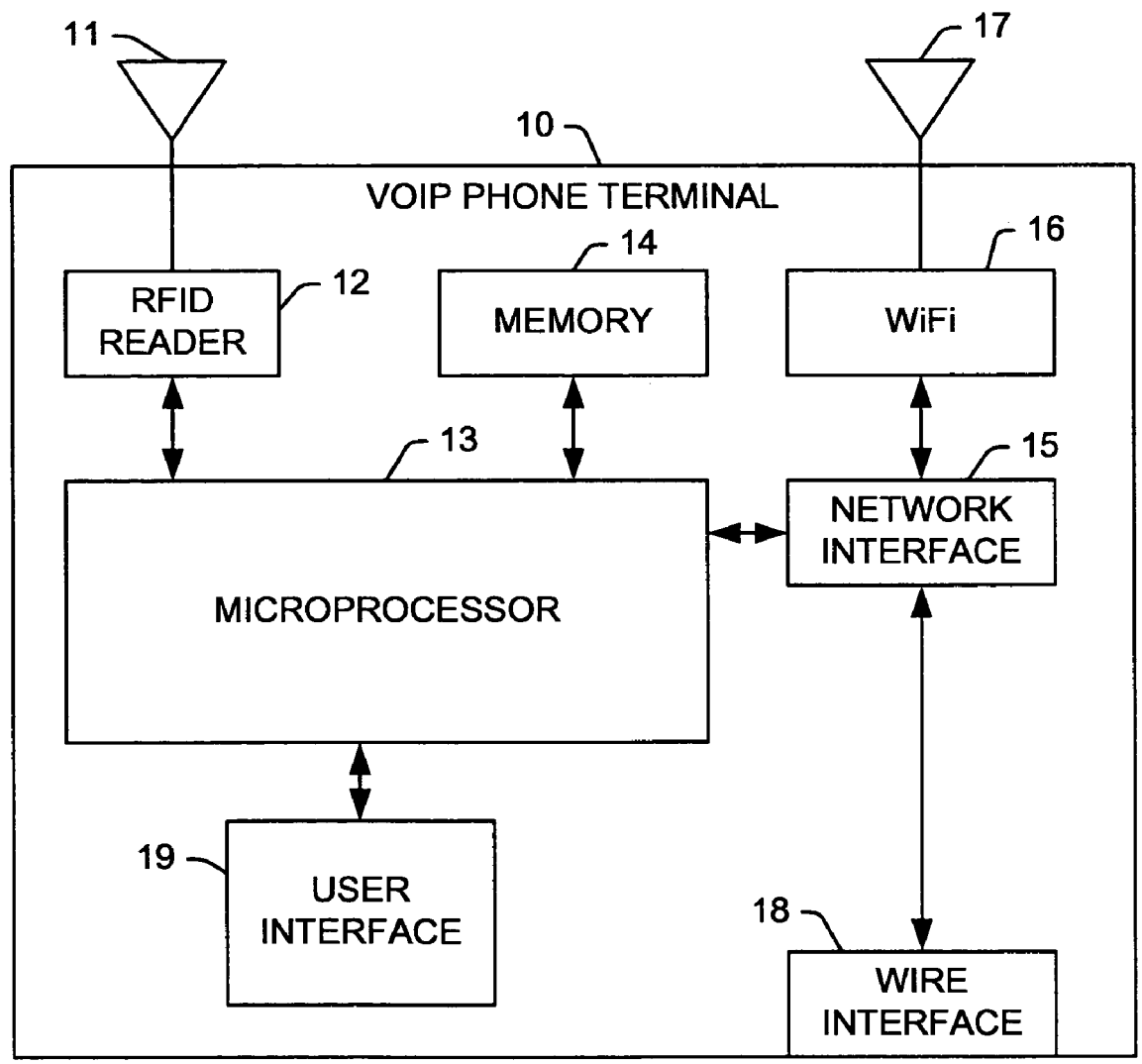
FIG. 2 is a system diagram illustrating further details of an exemplary VOIP terminal including an integrated RFID reader and IP network interface components to facilitate determination of the VOIP terminal location in accordance with another aspect of the invention.

Referring initially to FIGS. 1 and 2, an exemplary enterprise 2 is illustrated in FIG. 1 with a VOIP phone type terminal 10 being operatively coupled with an IP-based network 20, wherein the VOIP terminal 10 is shown at two possible locations L1 and L2. In the first location L1, the terminal 10 is connected to the network 20 via cabling and known interconnection and interfacing hardware (not shown), by which the terminal 10 can provide voice-over IP telephony services to a user to place and receive calls, including 911 and other emergency calls. In accordance with the invention, the VOIP terminal 10 includes an RFID reader 12 operable to obtain data from one or more RFID tags 30-33 located near the first location L1 from which the location L1 can be determined to facilitate support of 911 or other emergency call services in the enterprise 2. In addition, the network connection at location L1 is through a wall plate 43 having an RFID reader 12a which can also be used to read one some or all of the RFID tags 30-33 for locating the VOIP terminal 10.

As shown in FIG. 1, the enterprise 2 is equipped with a number of RFID tags (exemplary tags 30-31 and 36-38 are shown in FIG. 1) positioned at various locations, wherein the tags may be mounted on or integrated into various facilities of the enterprise 2 in generally static locations so that an RFID reader-equipped VOIP terminal phone 10 can read the tags and forward the tag data to a network server for determining the phone location. The enterprise 2 may include many such RFID tags programmed with globally unique identification (GUID) data by which the identity of a given tag can be ascertained by reading the data programmed therein, wherein the GUID can be any number identifying the tag and can even be the geographic location of the tag. Several exemplary tags are shown, including a first tag (RFID 1) 30 mounted on or within a room number plate 40 in a given office, room, cubicle, etc. of the enterprise 2 in which the phone 10 is located at the first location L1, as well as tags 31-33 (RFID 24) associated with a light fixture 41, a desk 42, and a network connection wall plate 43, respectively. The wall plate 43 may also include an RFID reader 12a, whereby the reader 12a can be used to read the RFID tags 30-33 at location L1 and to report the RFID tag data obtained therefrom to the VOIP server 50 or other network device that uses the data to ascertain the VOIP terminal location. The RFID tags are preferably distributed throughout the enterprise such that at least one RFID tag is readable from most or all locations at which a VOIP terminal (e.g., terminal 10) may be positioned. In this regard, the VOIP terminal 10 may alternatively be at a second exemplary location L2 of the enterprise 2, within RFID read proximity or range of one or more other RFID tags 36 (RFID 26), 37 (RFID 43), and 38 (RFID 54).

The enterprise 2 includes various apparatus and components for interconnection of IP-based network elements to the IP network 20, including wired connection using wall plates such as RFID-equipped plate 43, and through an IMS WiFi network via a call session control function 80 and an associated base station 82 for wireless connection to the network 20, whereby VOIP phone terminals can implement telephone services through packet-based messages according to the IP protocol. Other IP-based devices, of course, can also be operatively connected to the network 20 for interaction with other devices on the network and devices in other connected networks, wherein access may be also provided via VPNs or other associated network services. As shown in the simplified illustration of FIG. 1, moreover, a network server 60 is coupled to the network 20 along with a VOIP server 50, a mapping data store 52, and a database 70.

The various network elements may communicate or transfer data therebetween using various signaling or messages, such as simple network management protocol (SNMP) or other suitable protocols, wherein the network and the elements thereof can include any suitable hardware, software, logic, or other components operative to provide an IP-based network that supports VOIP telephony and other network operations as are known. In the illustrated network system, the VOIP server 50 supports the VOIP telephone service in the network 20 and the network server 60 performs IP-network management functions, with the 911 (e.g., ALI) database 70 being operated by an emergency call service provider and being updatable by the VOIP server 50 to provide current location information for VOIP terminals connected to the network 20 in accordance with the invention. One or more of the servers 50, 60, and the database 70, and/or the functions implemented thereby, may be integrated or may be distributed across multiple network elements wherein all such variant implementations are contemplated as falling within the scope of the invention. In the illustrated implementation, the VOIP and network servers 50 and 60 may include internal data stores or be operatively associated with other databases (not shown) and the servers co-ordinate their information, where the VOIP server 50 is operable to query the network server 60 to obtain information from the network 20 and devices coupled thereto on a regular basis, or the VOIP server 50 can query the VOIP phone terminal 10 and other network elements directly, for instance, using SNMP messages.

Figures 13, 14:
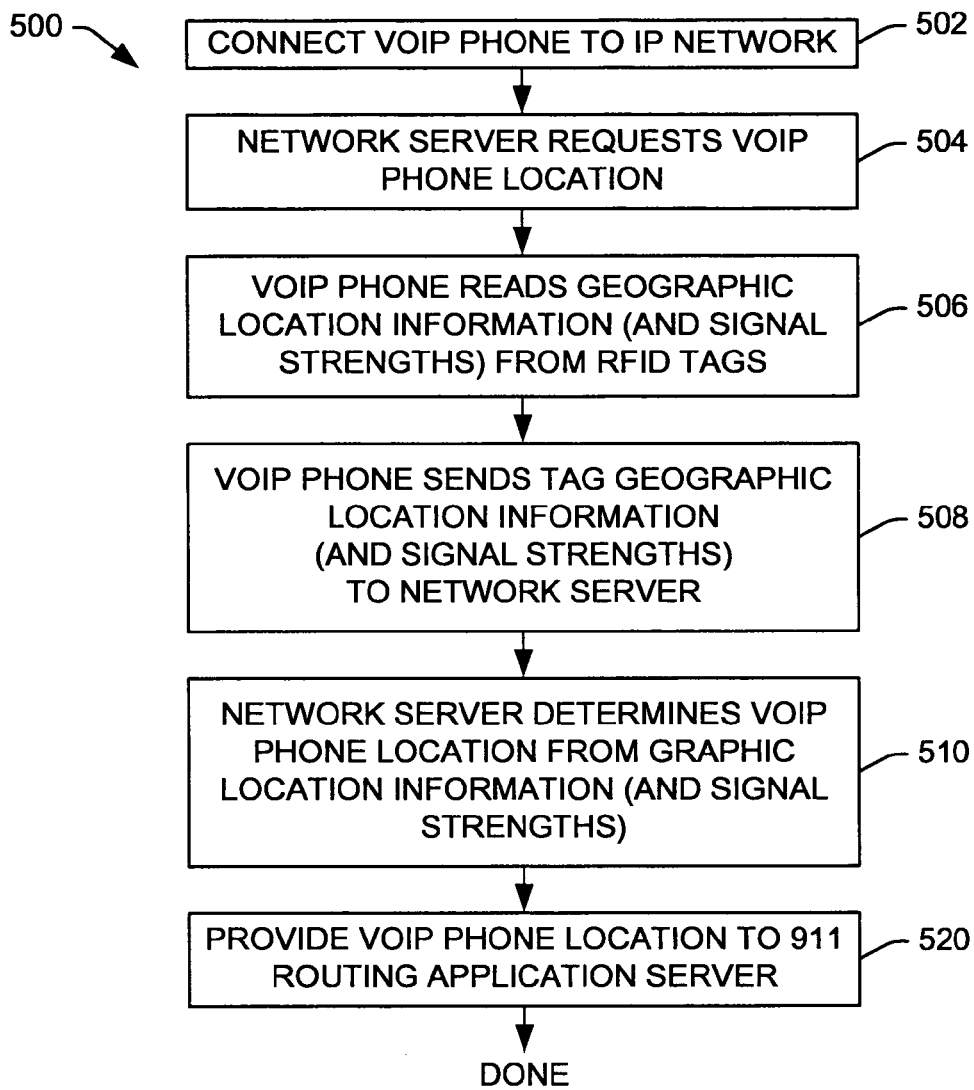
FIG. 13 is a flow diagram illustrating another possible method of determining VOIP phone locations, in which a VOIP phone reads geographic location information programmed into one or more RFID tags and a network server determines the phone location based on the tag data in accordance with the invention.
FIG. 14 is a schematic diagram illustrating RFID tag data and signal strengths read by the VOIP phone from several tags at a first location, where the tag data includes geographic information indicating the tag position in the enterprise of FIG. 1.

In general, when the VOIP terminal 10 is initially connected to the network 20 (e.g., at location L1 or L2 in FIG. 1), the device 10 registers with the network 20 via messages to and from the network server 60. During registration, the network server 60 requests location information from the VOIP terminal 10, and may thereafter request the location if the phone 10 re-registers, or periodically, or if an emergency call is initiated from the VOIP phone 10, or at any other time. When the location is requested, the phone 10 reads the RFID tags in it's vicinity (e.g., any RFID tag from which data can be obtained at the current phone location) using the inboard RFID reader 12 (or the wall plate reader 12a), and reports GUIDS or geo locations received from the tags, and possibly the corresponding signal strengths to the network server 60 (e.g., by suitable SNMP or other response messaging or signaling), which then relays the RFID tag data (e.g., and signal strength information) to the VOIP server 50. Examples of RFID tag GUID readings and signal levels obtained by the VOIP terminal 10 are shown in FIGS. 10A, 10B, and 14 below.

In one implementation of the invention, the VOIP server 50 maintains an internal data store, or operates on a mapping in the 911 database 70, or is operatively associated with a data store or database 52 that includes RFID GUIDs and corresponding geographic locations (a tag GUID to location mapping, as illustrated in FIG. 9 below) to use in determining the current location of the VOIP terminal 10 based on the RFID tag data. In another implementation (FIGS. 11-14 below), the RFID tags are programmed with location information, and the server 50 determines the location of the VOIP phone 10 directly from the reported tag data without consulting a data store 52 or mapping thereof. In either case, the VOIP server 50 then updates the 911 database 70 with the current location of the VOIP terminal 10 so that emergency services, if needed, can be directed to the correct location (e.g., L1 or L2) in the enterprise 2. In this regard, a data store 52 of the server 50 or the database 70 can store the mapping of RFID GUIDs to RFID locations for access by any network element logic that operates to discern VOIP locations based on RFID tag readings. The network management server 60, in the illustrated example, acts as an intermediary for sending the RFID tag data from the queried VOIP phone 10, particularly during registration of the phone 10 with the network 20, with the VOIP server 50 requesting the network server 60 to provide the current valid set of information.

The 911 service provider (not shown) owns and operates the database 70, which may be an automatic location identifier (ALI) database. The VOIP server 50 operates to feed location information to the emergency call service provider, which then performs a comparison and correction function to maintain current location information in the database 70 for use by emergency service operators, dispatchers, etc. The VOIP server 50 in one implementation of the invention maintains an internal or external database 52 for storing all the GUIDs and their corresponding geographic location information (e.g., a GUID to location mapping), and the VOIP server 50 is programmed or otherwise adapted to determine an actual (e.g., or estimated) location for each phone number based on the GUIDs (e.g., and signal strength) read by the VOIP terminal 10 from one or more RFID tags, such as by triangulation, interpolation, extrapolation, or other suitable technique.

In one implementation, the mapping may be stored as part of an LDAP database for the VOIP server 50, which may include location information for a subscriber or for a presence in the system, as well as subscriber name, number, etc. The mapping, moreover, may be stored in any manner by which a location can be found for a given GUID to facilitate triangulation or other determination of the VOIP phone location. The VOIP server 50 provides the determined VOIP location (e.g., geographic location information or other data indicative of the location of the VOIP phone 10) to the database 70 or to the operator thereof, or to other back-end network elements that direct emergency calls to the suitable service center, where the location information may be combined with VOIP phone number, subscriber name, or other data, etc. so that if and when a 911 call is originated from the phone 10, the 911 call service provider takes the caller ID and searches the database 70 to get the location. The database 70, moreover, may be updated at any time, periodically, whenever the VOIP location changes, or at any other suitable time.

FIG. 2 illustrates further details of the exemplary RFID-enabled VOIP terminal phone 10, including an RFID reader system or circuitry 12 that is operatively coupled with an antenna 11 for communications and data transfer between the reader 12 and one or more RFID tags (e.g., tags 30-33 and 36-38 in FIG. 1), by which the VOIP terminal 10 can at any time obtain the RFID tag data from one or more such RFID tags to be used by a network element (e.g., server 50) in determining the location of the VOIP terminal 10. The VOIP terminal 10 further includes a microprocessor 13 connected to the RFID reader 12 as well as a memory (RAM, ROM, etc.) 14, a user interface 19 (e.g. including keypad, buttons, display, microphone, speaker, handset, other telephone terminal equipment, etc.) allowing a user (not shown) to interface with the VOIP terminal 10 for telecommunications and other services, as well as a network interface 15, which provides operational coupling of the VOIP terminal 10 with an IP-based network (e.g., IP network 20) through a wire line interface 18 or a WiFi (wireless) interface 16 connected to a second antenna 17.

In operation, the terminal 10 obtains RFID tag data from one or more RFID tags proximate the terminal 10 at a given location in the enterprise 2 by energizing the antenna 11 and reading the data from the responding tag(s), and then forwards the RFID tag data to a network element (e.g., server 50, 60, database 70, or other network element) using the network interface 15 and the other components thereof for use in determining the current location of the VOIP phone 10. The exemplary VOIP terminal 10 thus provides a network interface (15, 16, 17, 18 in FIG. 2) providing operative connection of the terminal 10 to the network 20, along with telephone apparatus (e.g., interface 19 and associated circuitry) to provide telephone service to a user through the network 10, together with the RFID reader 12, wherein the terminal 10 may further include software, firmware, logic or other means for providing the RFID tag data to a network element. Moreover, the terminal 10 is adapted or configured to obtain the RFID tag data and to forward the data to a network element (e.g., server 50) at any time, such as when an emergency call is initiated from the VOIP terminal 10, when the terminal 10 is connected to (e.g., registers with) the network 20, and/or when a network element (e.g., server 50, server 60, etc.) requests the location of the VOIP terminal 10. Alternatively, the RFID reader 12a of the wall plate 43 (FIG. 1) may perform the RFID reading and tag data forwarding functions.

Figure 3:
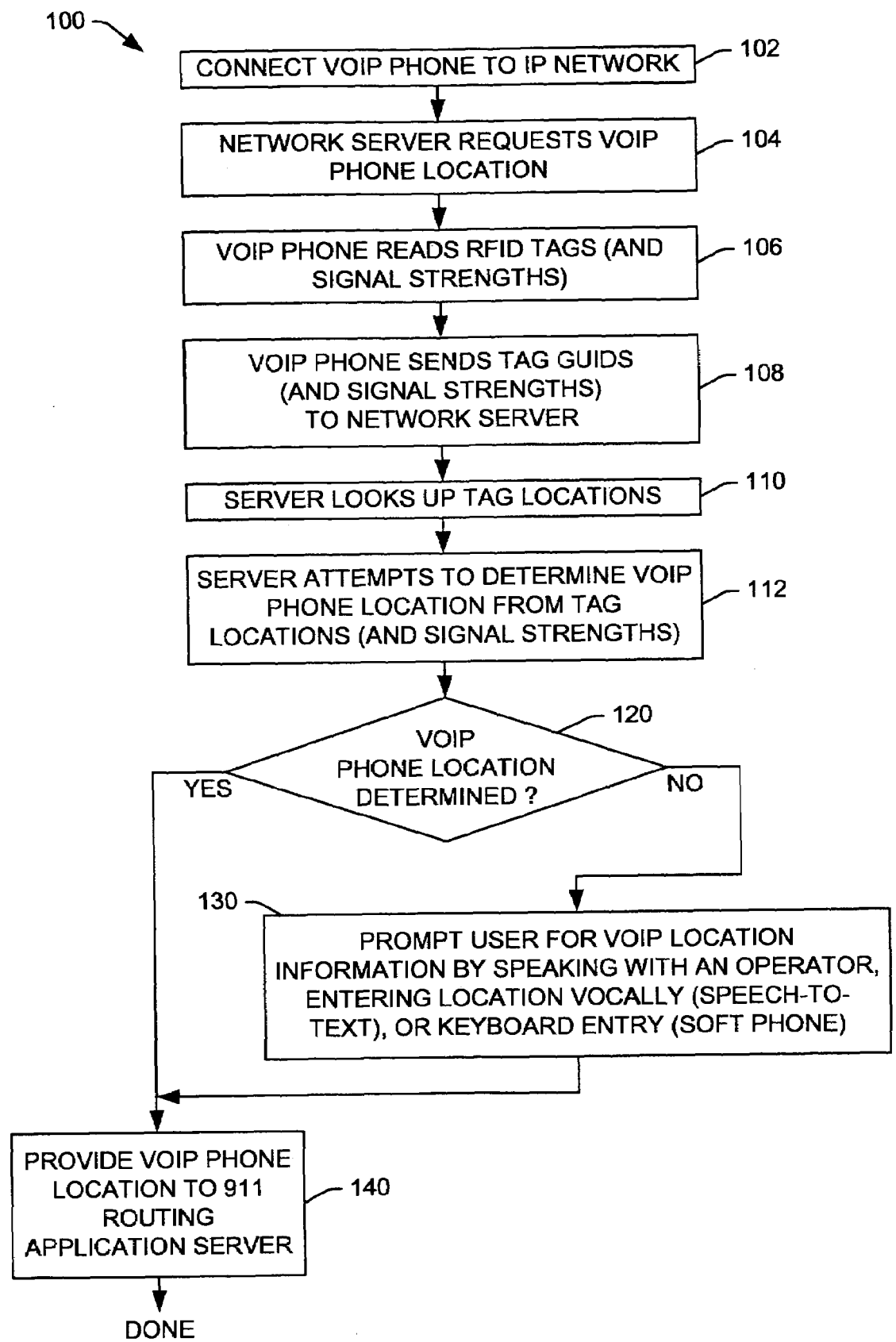
FIG. 3 is a flow diagram illustrating a method of locating VOIP terminal devices according to data read from RFID tags during registration when the VOIP terminal is connected to an IP-based network in accordance with the invention.

FIG. 3 illustrates an exemplary method 100 for determining the location (e.g., L1 or L2 in the example of FIG. 1) of a VOIP terminal (terminal 10 above) in accordance with the present invention, in which RFID tag data is read from one or more RFID tags using an RFID reader (e.g., reader 12 or reader 12a) associated with the VOIP terminal at it's current location, and the VOIP terminal location is determined based on RFID tag data, wherein the VOIP terminal location is provided to an emergency call service provider. While the method 100 and other methods of the invention are illustrated and described hereinafter as a series of acts or events, it will be appreciated that the various methods of the invention are not limited by the illustrated ordering of such acts or events. In this regard, some acts or events may occur in different order and/or concurrently with other acts or events apart from those illustrated and described herein in accordance with the invention. It is further noted that not all illustrated steps may be required to implement a process or method in accordance with the present invention. The methods of the invention, moreover, may be implemented in association with the illustrated communication systems, messages, and user equipment or terminals, as well as other apparatus not illustrated or described, wherein all such alternatives are contemplated as falling within the scope of the present invention and the appended claims. For example, the methods of the invention may be implemented in the exemplary VOIP terminal 10 and network elements of FIG. 1 above for locating VOIP terminals in the enterprise 2.

The method 100 begins at 102 in FIG. 3, where a VOIP phone or terminal (e.g., terminal 10 of FIGS. 1 and 2 above) is connected to an IP network (network 20) at 102, and a network server (e.g., server 60 or VOIP server 50) requests the VOIP phone location at 104, for example, by SNMP messaging during registration with the network 20. The VOIP phone 10 reads one or more RFID tags to obtain RFID tag data therefrom at 106, and may optionally also read the associated signal strengths of the received signals. In one embodiment of the invention, the RFID tags are read by a reader 12 integrated in the VOIP terminal 10 itself. In another implementation, a, RFID reader 12a can be integrated into a wall plate (plate 43 in FIG. 1 or other network structure connected to the VOIP terminal 10 and to the network 20). FIGS. 10A and 10B illustrate examples of such data 300 obtained for the two illustrated VOIP phone locations L1 and L2, respectively. It is noted that the illustrated ordering of steps 104 and 106 is merely one possibility, wherein the request at 104 by the network server or other network element for the VOIP location and the reading of the RFID tag data at 106 can be done at any relative times, and asynchronously of one another. For example, the VOIP terminal 10 may read the RFID tags periodically and store the tag data in an internal register such that at any time, the tag data is current. In this case, the network element (e.g., server 50 or 60) may request the VOIP location at any time and obtain the RFID readings simply by reading the appropriate VOIP terminal registers. In this manner, the VOIP terminal 10 can quickly provide the tag data to a requesting network element without having to wait to do another reading.

As discussed above, the RFID tags are preferably programmed with a GUID or other unique identifying information (e.g., including geographic location data), and the phone 10 sends the tag GUID(s) (e.g., and optional signal strength information, if obtained) to the network server at 108 (e.g., to network server 60 or VOIP server 50). In one implementation, the network server 60 performs registration tasks when the VOIP phone 10 is initially connected to the network 20, including requesting location and receiving the RFID tag data from the phone 10, which data is then provided to the VOIP server 50. In this implementation, the server 50 maintains a mapping or data store 52 indicating a geographic position (e.g., longitude, latitude, altitude, etc.) for each RFID tag GUID, and the server 50 obtains the tag locations at 110 and uses logic or software employing triangulation and/or other suitable techniques to attempt to determine the VOIP phone location at 112, which determination function may also employ the measured signal strengths.

A determination is made at 120 as to whether the VOIP phone location has been successfully determined through RFID means. If no location information was found in the data store, or no RFID tag readings were possible, or if the location otherwise cannot be determined from RFID readings (NO at 120), the user may be prompted at 130 to provide or enter the current VOIP terminal location, for example, by speaking with an operator, by entering the information vocally with speech to text conversion being used to update the location information in the server 50, by keyboard entry, for example, for soft phone terminals, or by other means, and if successful, the determined VOIP phone location is provided to the emergency call service provider at 140 (e.g., to the ALI database 70 in FIG. 1, or to an application server associated therewith, etc.). However, if the server 50 was able to automatically determine the current VOIP location using RFID means (YES at 120), this information is provided at 140.

Figure 4:
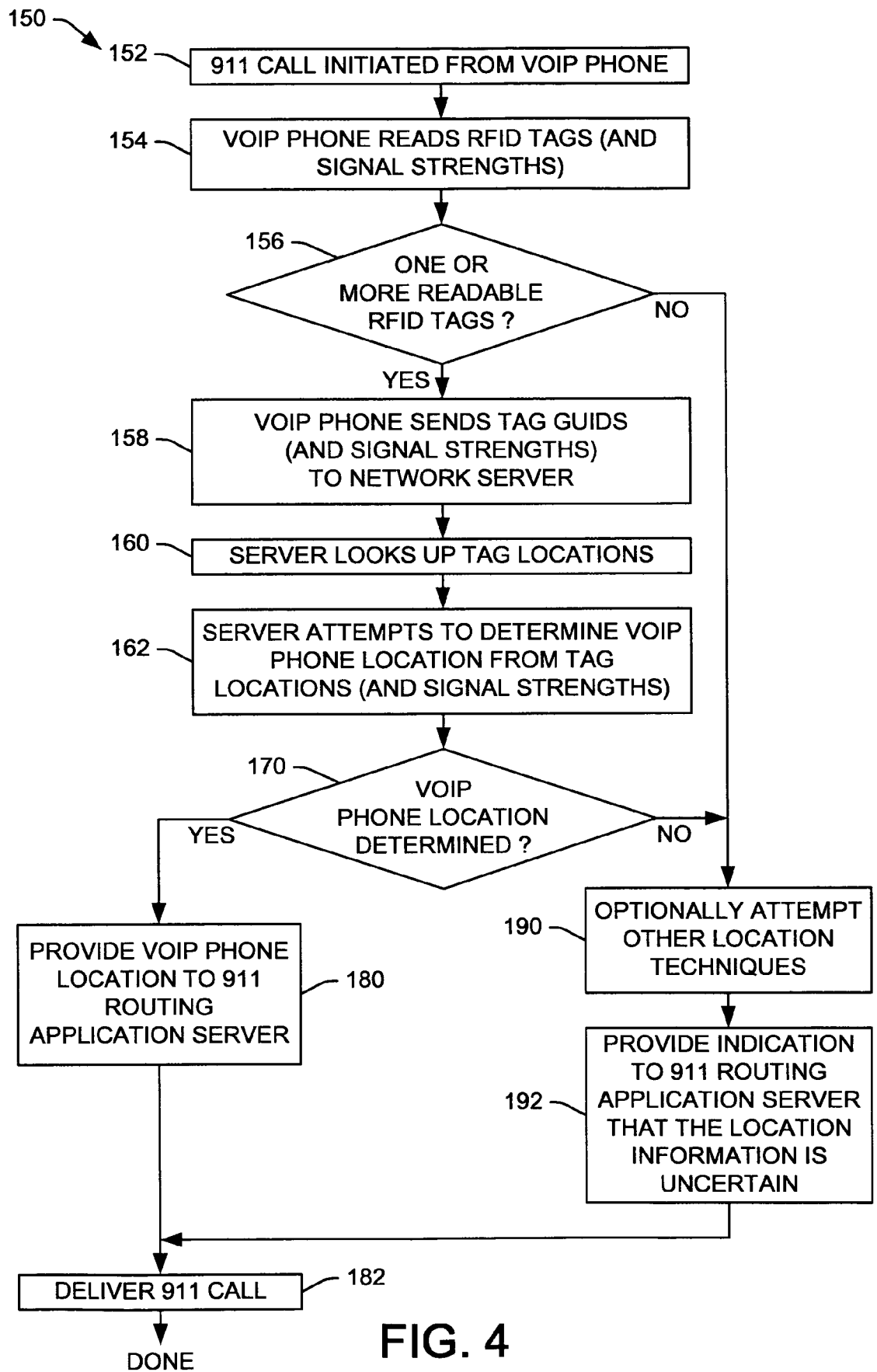
FIG. 4 is a flow diagram illustrating initiation of a 911 emergency call from a VOIP phone terminal in which the terminal reads RFID tags and sends the tag data to a network server for determination of the VOIP phone location and provision of the current phone location to a 911 routing application server according to the invention.

FIG. 4 illustrates a method 150 for determining the VOIP location and providing the same to an emergency call service provider when a user initiates an emergency (e.g., 911) call at 152 in accordance with the invention. The VOIP phone 10 reads data (e.g., and optionally signal strength) from one or more RFID tags 154. A determination is made at 156 as to whether any readable tag data (e.g., GUID) was obtained, and if not (NO at 156), other location techniques may be tried at 190 (e.g., wireless triangulation techniques if calling through an IMS WiFi or other wireless connection, etc.). If the RFID system is unable to ascertain the location through RFID tag data, an indication is provided at 192 to the 911 service provider that the location information in the current ALI database 70 is uncertain or may be suspect, and the emergency call is delivered at 182, whereby a 911 operator or dispatcher may be alerted to attempt to prompt the caller for location information vocally during the call.

If at least one readable RFID tag GUID was obtained (YES at 156), the VOIP phone 10 sends the GUID(s) (and optionally the associated signal strengths) to the network server at 158 (e.g., to server 50 through server 60 or directly in one example), and the server 50 obtains the tag locations at 160 (e.g., from a mapping within an internal data store 52 of or associated with the VOIP server 50). The server 50 then attempts to determine the VOIP phone location at 162, based on the GUID(s) and any optional signal strength information. A determination is made at 170 as to whether the VOIP phone location has been successfully determined. If not (NO at 170), the method makes other attempts and alerts the 911 service provider at 190 and 192 and delivers the call at 182, as described above. Otherwise (YES at 170), the determined VOIP phone location is provided at 180 to the emergency service provider and the call is delivered at 182. As discussed above, the VOIP phone 10 can read and forward the RFID tag information, and the server 50 can use this information to determine the phone location and update the emergency service provider at any suitable time, including but not limited to when the VOIP phone is connected to the network 20 (method 100 of FIG. 3), when a user initiates an emergency call (method 150 of FIG. 4), periodically, or when location information is requested by any network element for the VOIP phone 10, wherein all such alternative implementations are contemplated as falling within the scope of the present invention and the appended claims.

Figure 5:
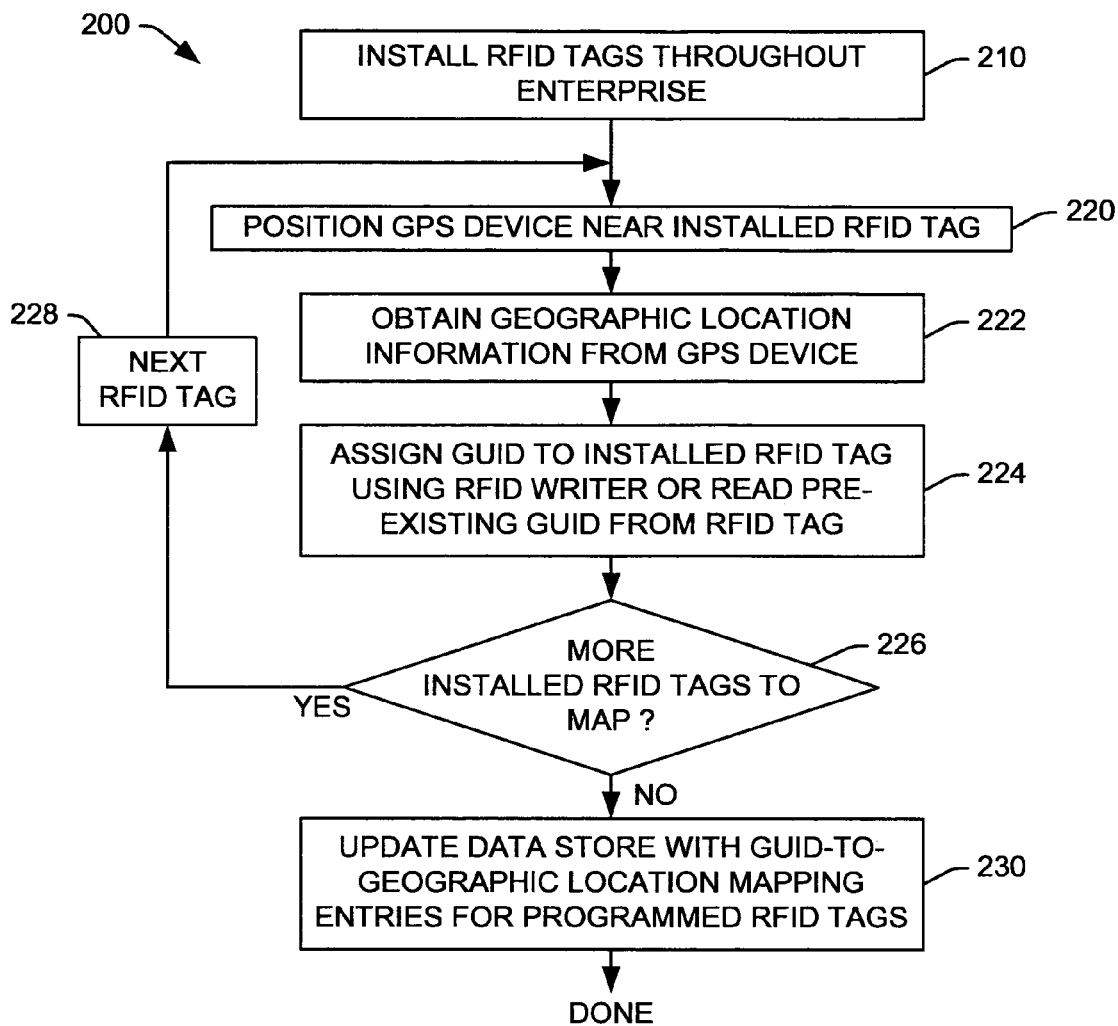
FIG. 5 illustrates a method for creating a mapping of RFID tag GUIDs and locations in an enterprise according to yet another aspect of the invention.
Figure 6:
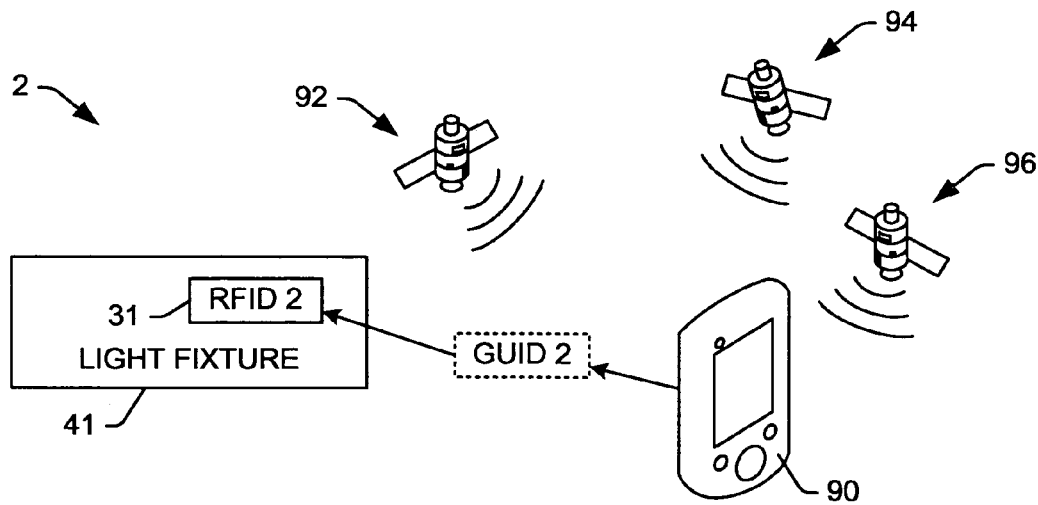
FIG. 6 is a simplified schematic diagram illustrating creation of the RFID tag GUID to location mapping using a GPS-enabled RFID reader/writer device to ascertain the geographic location of an RFID tag and to write a GUID to the tag generally according to the method of FIG. 5.

Referring now to FIGS. 5 and 6, FIG. 5 illustrates a method 200 for creating a mapping of RFID tag GUIDS and locations (e.g., mapping 52 in FIG. 9 below) in the exemplary enterprise 2 according to the invention. FIG. 6 illustrates creation of the GUID to location mapping using a GPS-enabled RFID reader/writer device 90 to ascertain the geographic location of an RFID tag (RFID 2) 31 on the light fixture 41 of the enterprise 2 using GPS satellites 92, 94, 96, and to write a GUID (GUID 2) to the tag 31 generally according to the method of FIG. 5. A plurality of RFID tags are installed at 210 throughout the enterprise, and a GPS device 90 (FIG. 6) is positioned at 220 near an installed tag 31. The GPS data or other geographic location information (e.g., longitude, latitude, altitude, etc.) is obtained at 222 using the device 90 and the GPS satellites 92, 94, 96, wherein three such satellites are shown in FIG. 6, but any suitable number may be used in getting the GPS co-ordinates. A GUID is assigned and programmed into the tag 31, or a pre-existing GUID is read from the tag 31 at 224, and the device 90 stores the GUID and the corresponding geographic location information for constructing or updating the mapping 52 used by the VOIP server 50. A determination is made at 226 as to whether more installed RFID tags are to be mapped, and if so (YES at 226), the operator moves to the next tag at 228 and the process is repeated for remaining tags at 220-226 as described above. When the tags have all been mapped (NO at 226), the data store (mapping) 52 used by the server 50 is updated at 230 to complete the method 200. In this manner, a mapping 52 of RFID locations and GUIDs is available for use in determining the location of a VOIP phone that is able to read one or more of the RFID tags for providing the phone location to an emergency call service provider.

Figure 7:
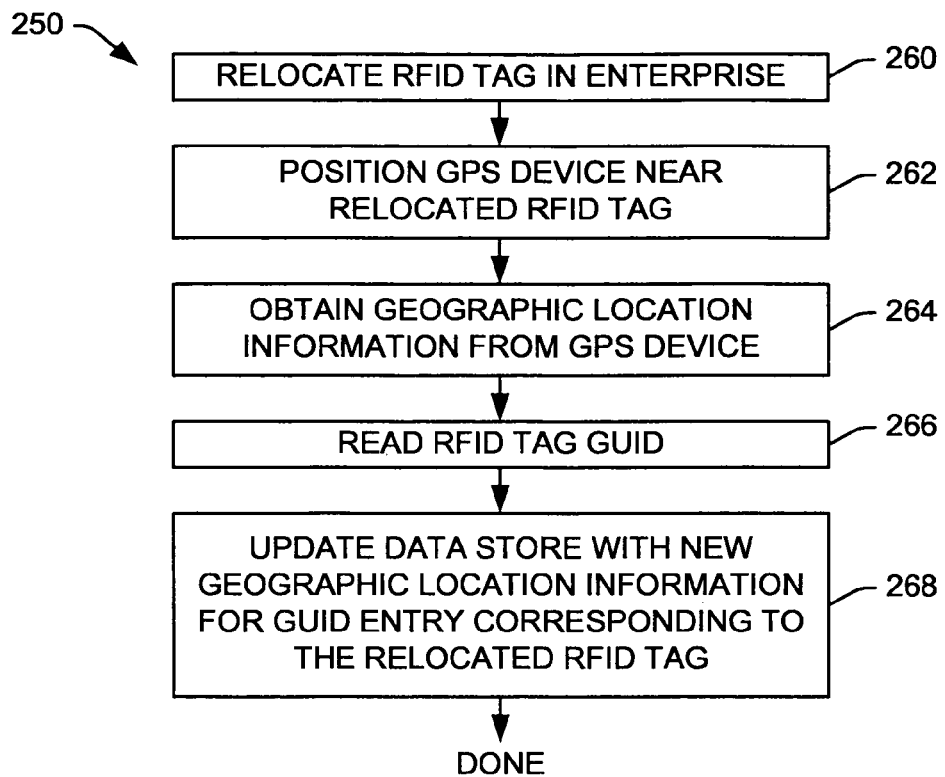
FIG. 7 is a flow diagram illustrating a related method of updating the GUID to location mapping entry for an RFID tag that has been relocated in an enterprise.
Figure 8:
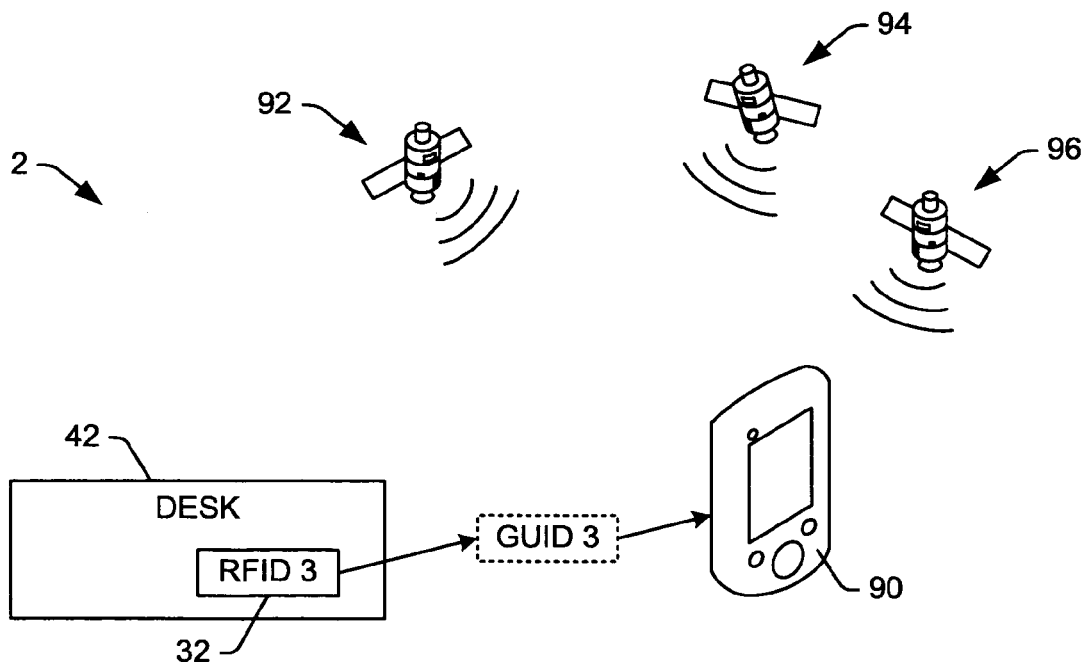
FIG. 8 is a simplified schematic diagram illustrating a GPS-enabled RFID reader/writer determining new location information and reading a GUID from a relocated RFID tag in an enterprise.

Referring now to FIGS. 7 and 8, a method 250 is illustrated in FIG. 7 for updating the mapping 52 when an RFID tag is moved to a different position in the enterprise 2. For example, as shown in FIG. 8, the desk 42 may be moved at 260 in FIG. 7 to a different cubicle within an office building or to a different building within the enterprise 2, wherein the embedded RFID tag (RFID 3) 32 is also relocated. At 262, the GPS device (90) is positioned near the relocated RFID tag 32 and GPS co-ordinates are obtained at 264 for this new location of the tag 32 and desk 42. The tag data (GUID 3) is read from the tag 32 at 266, and the new geographic location is updated in the data store (52 in FIG. 1) in the entry for the GUID to complete the method 250. Thus, using the methods 200 and 250 of FIGS. 5 and 7, the RFID tag GUID to location mapping 52 can be constructed and maintained for the enterprise 2 such that RFID tag GUID readings by VOIP terminal 10 can be used to quickly locate the terminal 10 to facilitate provision of emergency call services.

Referring now to FIGS. 9-10B, FIG. 9 illustrates a portion of one exemplary GUID to location mapping in the data store 52 maintained by the VOIP server 50, which may be physically located in any storage medium, integrated or distributed, that is accessible by the server 50 or other network element operatively connected to the network 20, where the data store 52 may be integrated in the VOIP server 50 in one implementation. As shown in FIG. 9, the mapping constructed by the above techniques includes entries $54_1$ through $54_N$ corresponding to an integer number "N" RFID tags within the enterprise 2, where each entry 54 includes a GUID programmed in a given RFID tag and geographic location information indicating the location of the given RFID tag.

FIG. 10A illustrates RFID data 300a including RFID tag data and optional signal strength information obtained from the exemplary VOIP terminal 10 at the first location L1 in FIG. 1. At this position, the VOIP terminal 10 is able to read RFID tag data (GUIDs) from four tags 30-33, and is also adapted to ascertain a signal strength associated with the read response from the tags 30-33. The VOIP terminal 10 provides this information 300a to the VOIP server 50 (e.g., by way of the network server 60 in one example), and may also store this information internally.

FIG. 10B illustrates another case where the VOIP terminal 10 has been relocated to the second location L2 in FIG. 1, whereat the terminal 10 is able to read tags 36-38. Thus, at L2, the terminal 10 obtains data 300b including the GUIDs (GUID 26, GUID 43, and GUID 54) and signal strength readings from the RFID tags 36-38, which is then used in the VOIP server 50 or other network element to ascertain the current VOIP location according to the mapping 52.

Figure 11:
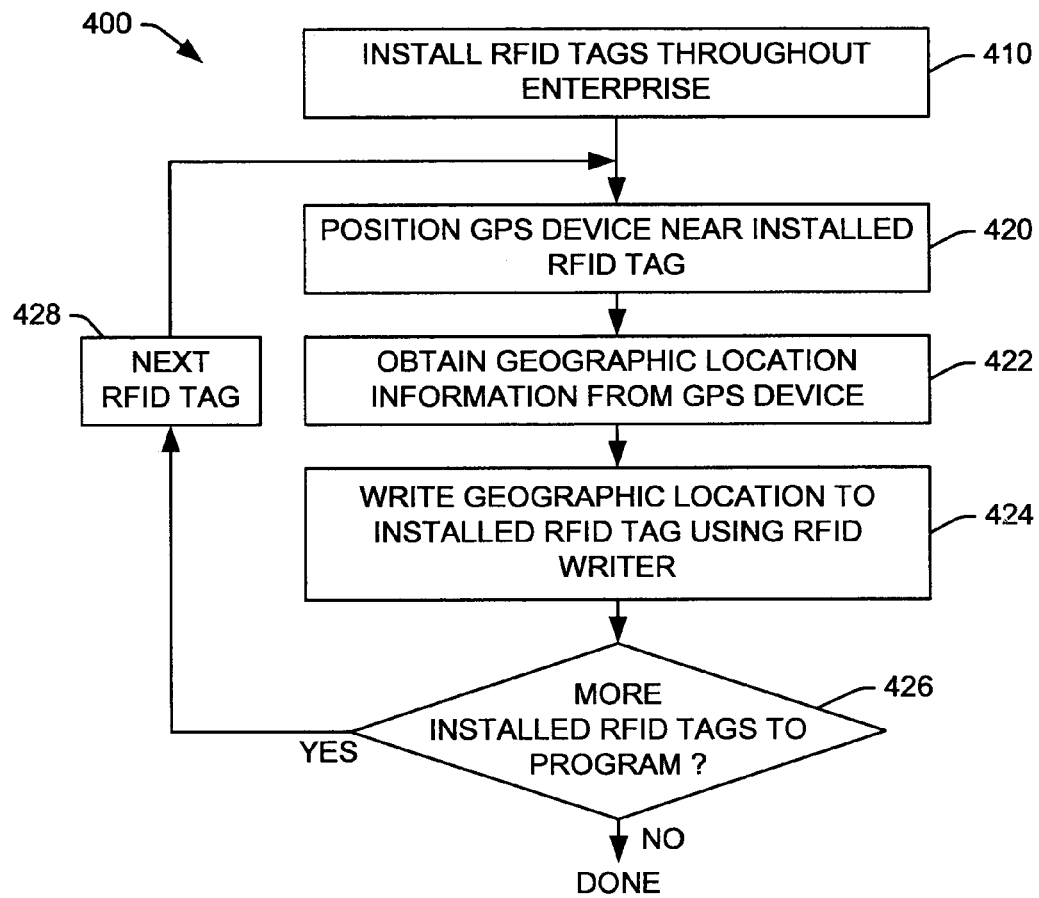
FIG. 11 is a flow diagram illustrating another technique for programming RFID tags, wherein the geographic location of the tags are determined and the tags are programmed with the location information.
Figure 12:
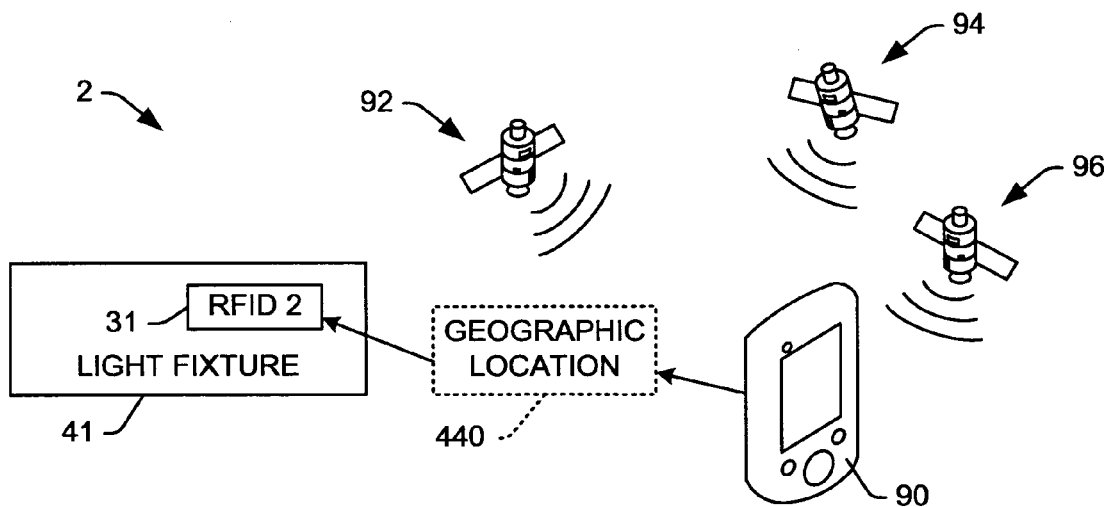
FIG. 12 is a schematic diagram illustrating programming of RFID tags with geographic location information generally according to the technique of FIG. 11.

Referring now to FIGS. 11-14, as mentioned above, another possible implementation of the present invention involves programming the geographic location information (e.g., GPS coordinates) directly in the RFID tags, in which case the server 50 may directly operate on the readings from the VOIP terminal 10 (e.g., using triangulation, interpolation, etc.) to determine the phone location without the need for the mapping in the data store 52. FIG. 11 shows an exemplary method 400 of programming the RFID tags within the enterprise 2 in this implementation of the invention, where a plurality of RFID tags are installed at 410, and a GPS device is positioned near a tag at 420. FIG. 12 illustrates an example where the RFID-enabled GPS device 90 is positioned near the enterprise light fixture 41 and the RFID tag 31 thereof. At 422 in the method 400, the corresponding GPS or other geographic location information 440 is obtained using the device 90, which is then written at 424 to the RFID tag 31 such that a subsequent read of the RFID tag 31 will provide the location 440 itself. A determination is made at 426 as to whether all tags have been thus programmed, and if not (NO at 426) the operator goes on to the next installed tag at 428 and the method 400 continues in this fashion until all the tags have been programmed with corresponding location information (NO at 426) to complete the method 400. It is noted that if all RFID tags in a given enterprise 2 are thus programmed with location information, the RFID tag data will be globally unique. Furthermore, RFID tags that are subsequently relocated can be reprogrammed using the device 90.

Referring now to FIGS. 13 and 14, the operation of the system is illustrated for locating the VOIP phone terminal 10 when initially connected to the network 20. Of course, similar techniques could be employed in locating the VOIP terminal 10 at other times, such as when an emergency call is placed (e.g., FIG. 4 above). Unlike the location determination techniques in FIGS. 3 and 4 above, however, the server 50, upon receiving the RFID tag data from the terminal 10, can directly determine the VOIP location without having to lookup GUIDs in a mapping database, since the tag data indicates the tag locations.

FIG. 13 shows a method 500 of determining a VOIP terminal location, where a VOIP terminal 10 is connected at 502 to the IP-based network 20, and the network server (e.g., server 60) requests the VOIP location at 504. Once requested, the VOIP phone 10 (or an associated in-line device such as a wall plate 43 in FIG. 1) reads one or more RFID tags to obtain RFID tag data therefrom at 506, and may optionally also read the associated signal strengths of the received signals. As discussed in connection with FIGS. 11 and 12, the RFID tags in this embodiment are programmed with geographic location (e.g., GPS) information, wherein FIG. 14 shows an example of data 550 obtained by the VOIP terminal 10 at the exemplary first location L1 in FIG. 1 by reading the RFID tags 30-33 at 506. At 508, the VOIP terminal 10 sends this data or information 550 to the network server (e.g., to network server 60 or VOIP server 50). The server (e.g., VOIP server 50) then determines the VOIP phone location at 510, using interpolation, triangulation, or other techniques, and provides the determined VOIP location to the emergency service provider at 520 to complete the method 500.

While the invention has been illustrated and described with respect to one or more exemplary implementations or embodiments, equivalent alterations and modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising ".

The invention claimed is:

1. A method for determining a location of a voice-over-IP (VOIP) terminal for improved emergency call services, the method comprising:
   reading RFID tag data from at least one RFID tag using an RFID reader operatively associated with the VOIP terminal; and
   determining the VOIP terminal location based on RFID tag data.

2. The method of claim 1, further comprising providing the VOIP terminal location to an emergency call service provider.

3. The method of claim 2, wherein the VOIP terminal location is determined and provided to the emergency call service provider when an emergency call is initiated from the VOIP terminal.

4. The method of claim 2, wherein the VOIP terminal location is determined and provided to the emergency call service provider when the VOIP terminal is connected to a network.

5. The method of claim 1, wherein the RFID tag data is read and the VOIP terminal location is determined when an emergency call is initiated from the VOIP terminal.

6. The method of claim 1, wherein the RFID tag data is read and the VOIP terminal location is determined when the VOIP terminal is connected to a network.

7. The method of claim 1, wherein the RFID tag data is read and the VOIP terminal location is determined when a network element requests the location of the VOIP terminal.

8. The method of claim 1, wherein reading the RFID tag data comprises reading RFID tag data from a plurality of RFID tags using the RFID reader of the VOIP terminal, and wherein the VOIP terminal location is determined based on the RFID tag data from the plurality of RFID tags.

9. The method of claim 1, further comprising providing a plurality of RFID tags, individual RFID tags being programmed with geographic location information indicating the location of the RFID tag, wherein the VOIP terminal location is determined based on the location indicated by the RFID tag data.

10. The method of claim 1, wherein the RFID tag data is read using an RFID reader integrated in the VOIP terminal.

11. A method for determining a location of a voice-over-IP (VOIP) terminal for improved emergency call services, the method comprising:
    reading RFID tag data from at least one RFID tag using an RFID reader operatively associated with the VOIP terminal;
    determining the VOIP terminal location based on RFID tag data; and
    reading signal strengths for the plurality of RFID tags using the RFID reader of the VOIP terminal; wherein the VOIP terminal location is determined based on the RFID tag data and the signal strengths read from the plurality of RFID tags, wherein reading the RFID tag data comprises reading RFID tag data from a plurality of RFID tags using the RFID reader of the VOIP terminal, and wherein the VOIP terminal location is determined based on the RFID tag data from the plurality of RFID tags.

12. A method for determining a location of a voice-over-IP (VOIP) terminal for improved emergency call services, the method comprising:
    reading RFID tag data from at least one RFID tag using an RFID reader operatively associated with the VOIP terminal;
    determining the VOIP terminal location based on RFID tag data; and
    providing a database with a plurality of entries corresponding to a plurality of RFID tags, each database entry including a globally unique ID (GUID) programmed in a given RFID tag and geographic location information indicating the location of the given RFID tag.

13. The method of claim 12, wherein determining the VOIP terminal location based on RFID tag data comprises searching the database to find an entry having a GUID matching the RFID tag data and obtaining the geographic location information from the entry.

14. A method for determining a location of a voice-over-IP (VOIP) terminal for improved emergency call services, the method comprising:
    reading RFID tag data from at least one RFID tag using an RFID reader operatively associated with the VOIP terminal; and
    determining the VOIP terminal location based on RFID tag data;
    wherein the RFID tag data is read using an RFID reader integrated in a network structure connected to the VOIP terminal and to the network.

15. A method for providing a mapping of VOIP phone numbers and locations in an enterprise, the method comprising:
   providing a plurality of RFID tags at different locations within an enterprise, the RFID tags being programmed with a globally unique ID (GUID);
   providing a database with a plurality of entries corresponding to the plurality of RFID tags, each database entry including a globally unique ID (GUID) programmed in a given RFID tag and geographic location information indicating the location of the given RFID tag;
   installing a plurality of VOIP terminals in the enterprise;
   reading RFID tag data from at least one of the RFID tags using RFID readers of the VOIP terminals; and
   determining the locations of the VOIP terminals in the enterprise based on the RFID tag data read by the VOIP terminals and based on the geographic location information in the database.

16. A system for determining a location of a voice-over-IP (VOIP) terminal in an enterprise, the system comprising:
   a plurality of RFID tags located at different locations within the enterprise;
   a VOIP terminal having means for reading RFID tag data from at least one of the RFID tags; and
   means for determining the VOIP terminal location based on the RFID tag data.

17. The system of claim 16, further comprising means for providing the VOIP terminal location to an emergency call service provider.

18. The system of claim 17, wherein the VOIP terminal location is determined and provided to the emergency call service provider when an emergency call is initiated from the VOIP terminal, when the VOIP terminal is connected to a network, or when a network element requests the location of the VOIP terminal.

19. A system for determining a location of a voice-over-IP (VOIP) terminal in an enterprise, the system comprising:
   a plurality of RFID tags located at different locations within the enterprise;
   a VOIP terminal having means for reading RFID tag data from at least one of the RFID tags; and
   means for determining the VOIP terminal location based on the RFID tag data;
   wherein the VOIP terminal comprises means for reading RFID tag data and signal strengths from a plurality of RFID tags, and wherein the means for determining the VOIP terminal location determines the VOIP terminal-location based on the RFID tag data and the signal strengths read from the plurality of RFID tags.

20. A system for determining a location of a voice-over-IP (VOIP) terminal in an enterprise, the system comprising:
   a plurality of RFID tags located at different locations within the enterprise;
   a VOIP terminal having means for reading RFID tag data from at least one of the RFID tags; and
   means for determining the VOIP terminal location based on the RFID tag data;
   wherein the means for determining the VOIP terminal location comprises a database with a plurality of entries corresponding to a plurality of RFID tags, each database entry including a globally unique ID (GUID) programmed in a given RFID tag and geographic location information indicating the location of the given RFID tag.

21. A VOIP terminal, comprising:
   a network interface providing operative connection of the VOIP terminal to a network;
   a telephone apparatus operative to provide telephone service to a user through the network;
   means for reading RFID tag data from at least one RFID tag; and
   means for providing the RFID tag data to an element of the network.

22. The VOIP terminal of claim 21, wherein the VOIP terminal reads the RFID tag data and provides the RFID tag data to the network element when an emergency call is initiated from the VOIP terminal, when the VOIP terminal is connected to a network, or when a network element requests the location of the VOIP terminal.

* * * * *